US008198534B2

(12) United States Patent
Hotz et al.

(10) Patent No.: US 8,198,534 B2
(45) Date of Patent: Jun. 12, 2012

(54) HOUSEHOLD APPLIANCE

(75) Inventors: Dieter Hotz, Dischingen (DE); Cengiz Kücük, Syrgenstein (DE); Pedro Sancho, Zaragoza (ES); Manfred Seeβle, Gerstetten (DE); Wilhelm Thibaut, Sontheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 225 days.

(21) Appl. No.: 12/682,893

(22) PCT Filed: Oct. 15, 2008

(86) PCT No.: PCT/EP2008/063863

§ 371 (c)(1), (2), (4) Date: Apr. 14, 2010

(87) PCT Pub. No.: WO2009/056445

PCT Pub. Date: May 7, 2009

(65) Prior Publication Data

US 2010/0212957 A1 Aug. 26, 2010

(30) Foreign Application Priority Data

Oct. 31, 2007 (DE) ......................... 10 2007 052 073

(51) Int. Cl.
*H02G 3/04* (2006.01)

(52) U.S. Cl. ........ 174/72 A; 174/72; 174/68.1; 174/100; 248/68.1; 211/26; 439/207

(58) Field of Classification Search ................ 174/72 A, 174/72 C, 68.1, 100; 361/826; 248/49, 68.1; 439/207; 211/26

See application file for complete search history.

(56) References Cited

U.S. PATENT DOCUMENTS

| | | | | |
|---|---|---|---|---|
| 3,643,349 | A | 2/1972 | Zenz | |
| 3,862,786 | A | 1/1975 | Brezosky | |
| 4,820,189 | A | 4/1989 | Sergeant et al. | |
| 5,336,849 | A * | 8/1994 | Whitney | 174/72 C |
| 5,756,933 | A * | 5/1998 | Pitchford et al. | 174/481 |
| 6,513,765 | B2 * | 2/2003 | Griffin et al. | 248/68.1 |
| 7,829,789 | B2 * | 11/2010 | Yamaguchi | 174/72 A |
| 8,003,888 | B2 * | 8/2011 | Owen, Sr. | 174/72 A |

FOREIGN PATENT DOCUMENTS

| | | | |
|---|---|---|---|
| CA | 2412296 | A1 | 5/2004 |
| DE | 9406488 | U1 | 7/1994 |
| DE | 19806043 | A1 | 8/1999 |
| DE | 19809224 | A1 | 9/1999 |
| EP | 1262704 | B1 | 4/2005 |

OTHER PUBLICATIONS

Foreign Patent Office Report—CN.

* cited by examiner

*Primary Examiner* — Dhirubhai R Patel

(74) *Attorney, Agent, or Firm* — James E. Howard; Andre Pallapies

(57) ABSTRACT

An appliance having a cable harness including a ground cable, the ground cable electroconductively connected to an electrically conductive component of the appliance. The cable harness is at least partially accommodated in a cable duct of the appliance. In an exemplary embodiment, a first contact element held on the cable duct and including an integrated first contact element is electroconductively connected to the ground cable of the cable harness, which comes into electrical contact with the electrically conductive component of the household appliance using an assembly movement.

8 Claims, 7 Drawing Sheets

HOUSEHOLD APPLIANCE

BACKGROUND OF THE INVENTION

Household appliances with a metallic treatment compartment for the treatment of items requiring treatment, such as dishwashers, washing machines and ovens, are nowadays obtainable in many forms via retail outlets.

In a typical structure, as currently also realized in the industrial series manufacture of household dishwashers produced by the applicant, the near-cuboid metallic treatment compartment is anchored onto a base bearer ("floor assembly") serving as a plinth for the setting-up of the household appliance. Four support columns are customarily provided for anchoring of the treatment compartment onto the base bearer, which project downwards into the corner areas of the treatment compartment and are fixed in the base bearer. Here, for example, two supports arranged in the frontal area of the household appliance are embodied as so-called hinge plates, which among other things serve to provide the swivel mounting of a compartment door capable of being swung down and forwards for opening and closing of the treatment compartment. The two hinge plates are for example connected to the treatment compartment by means of welding.

In addition to its functions as a plinth for setting-up of the household appliance and anchoring of the treatment compartment, the base bearer also serves to accommodate various appliance components, such as a central electrical control device ("power module"), which is connected to the electrical components of the household appliance via a multiplicity of electrical cables. Connection of the control device to the household electricity supply generally takes place via a power cable routed through the rear of the household appliance.

As in household appliances with front operation multiple electrical components are generally arranged in the frontal area of the appliance, the electrical cables leading into the frontal area of the appliance are typically combined into a cable harness, which is routed within a cable duct arranged in the frontal area of the appliance on a plinth plate fixed on the base bearer.

In order to meet electrical safety requirements, electrical household appliances require grounding, which is effected by connecting the electrically conductive (metallic) components of the household appliance to the ground connection of the household electricity supply. This applies in particular to the treatment compartments generally manufactured from a metallic material.

In the typical structure of a household appliance with treatment compartment as described above, the treatment compartment has hitherto been grounded via the support columns arranged in the frontal area, which serve to anchor it in the base bearer. For this purpose the ground connection of the household electricity supply is connected to a ground cable, which is routed together with the cable harness and after exit from the cable duct is fixed to one of the two support columns in the frontal area (hinge plates) by means of a so-called pigtail.

With reference to the FIGS. 1 to 3, this is now illustrated in greater detail. FIG. 1 shows, in a schematically three-dimensional representation, the arrangement of an approximately rectangular shaped cable duct 101 on a plinth plate 102 which is only partially shown, and which is mounted on a base bearer, which is not shown, in the frontal area of a household appliance. The cable duct 101 is fixed on the plinth plate 102 using angle brackets 103, for example by means of welding. A cable harness 104 is routed through the cable duct 101, which contains a multiplicity of electrical cables for power supply purposes and for controlling electrical components of the appliance in the frontal area.

FIG. 1 shows, relative to the front of a household appliance, a left-hand front section of the plinth plate 102. The cable harness 104*a* entering through a rear opening 105 of the cable duct 101 leads from a central control device for power supply and the control of electrical components of the household appliance, which is accommodated in the base bearer and is or can be electrically connected to a household power supply. The cable harness 104*b* emerging from a frontal opening 106 of the cable duct 101 is divided into individual cables and supplies the electrical components of the household appliance located in the frontal area. In the case of a household dishwasher this involves, for example, the operating console for manual user inputs and the displaying of program steps arranged in the frontal area, the so-called dosage unit, via which detergent can be fed into the dishwasher under program control, and a compartment lock, which for example only permits the execution of a wash program if it is locked, and can interrupt a currently running program step upon opening of the compartment door.

FIG. 2 and FIG. 3 show three-dimensional representations of the arrangement of the cable duct 101 mounted on the plinth plate 102 in the household appliance. The plinth plate 102 is mounted on a base bearer, which is not shown in greater detail, as a plinth for setting-up of the household appliance. A metallic treatment compartment 108, the left-hand lower corner of which is shown in sectional form, is anchored in the base bearer via a welded-on metallic hinge bearer 107 by means of a downward projecting carrier leg 111 of the hinge bearer 107. Such a hinge bearer 107 is provided in the frontal area on both sides of the treatment compartment 108.

As is further evident from FIGS. 2 and 3, a ground cable 109 which is or can be connected to the ground connection of the household electricity supply is routed in the cable harness 104, which after emerging from the frontal opening 106 of the cable duct 101 is fixed on the hinge bearer via an eyelet 110 formed at the end as a so-called pigtail. To this end, the eyelet is fixed to the hinge plate 107 by means of a fixing screw 114 guided through this, which is screwed into a threaded hole 112 on a fixing tab 113 of the hinge bearer formed through the angle of bend, in order in this way to connect, electroconductively, the ground cable 109 to the hinge plate 107 and thus to the treatment compartment 108.

Upon assembly of the household appliance, the cable duct 101 is initially mounted on the plinth plate 102, which is then subsequently fixed on the base bearer with the preassembled cable duct 101.

One disadvantage in the case of conventional grounding of the treatment compartment 108 is in particular the fact that a relatively long ground cable 109 for connection of the hinge plate 107 and a separate fixing screw 114 for fixing of the ground cable 109 to the hinge plate 107 are required. Additionally, separate assembly of the pigtail by a fitter is necessary, so that in industrial series production manufacturing costs are hereby increased to a not-inconsiderable extent as a result of the material, storage and personnel costs thereby incurred.

There is accordingly a need for a generic household appliance, which avoids the cited disadvantage and in industrial series production enables a grounding of the treatment compartment which is both technically simple to effect and is at the same time cost-effective.

BRIEF SUMMARY OF THE INVENTION

The invention is based on a household appliance, for example a dishwasher, at least having a cable harness which is at least partially accommodated in a cable duct and a ground cable, which is electroconductively connected to an electrically conductive component of the household appliance.

According to the invention, the first contact element is held on the cable duct and is provided with an integrated first contact element electroconductively connected to the ground cable of the cable harness, which comes into electrical contact with an at least partially electrically conductive component of the household appliance by means of an assembly movement. The assembly and material effort are hereby reduced, as the creation of an electroconductive contact by means of a screw as was previously the case, is not required.

It is preferably provided for that the cable duct is fixed to the electrically conductive component by the assembly movement. It is here preferably provided for that the electrically conductive component is electroconductively connected to an at least partially electroconductive clear area of the household appliance. Here, the clear area can preferably take the form of a treatment compartment such as the washing compartment of a dishwasher, which rests on metal support columns.

The inventive household appliance is distinguished in an important manner in that the cable duct is fixed on one of the support columns, for example by means of an in particular latching plug-in connection. It is further distinguished in that it is provided with an integrated (first) contact element electrically connected to a ground cable, which is arranged in such a way that it comes into electrical contact with the support struts through assembly of the cable duct on the support column. The word “integrated” should here and hereinafter be taken to mean that the first contact element is fixed on or in the cable duct.

According to the invention the simultaneous assembly of the cable duct and grounding of the treatment compartment are enabled for the first time, whereby material costs and assembly time can be saved.

In an advantageous embodiment of the inventive household appliance the first contact element is embodied in the form of a (metallic) contact reed fixed on the duct housing. In particular it is advantageous in this case if the support column, on which the cable duct is mounted, is provided with a second contact element which comes into contact with the first contact element upon assembly of the cable duct. The second contact element is here in particular embodied in the form of a contact link formed on the support column.

The support column for fixing of the cable duct advantageously takes the form of a support column (“hinge plate”) which serves to provide the swivel mounting of a front door, where the cable duct is arranged in the frontal area of the household appliance.

The invention further extends to a cable duct with an integrated ground contact of a household appliance as described above.

BRIEF DESCRIPTION OF THE DRAWINGS

The invention is now illustrated in greater detail on the basis of an exemplary embodiment, with reference to the attached drawings.

DETAILED DESCRIPTION OF EXEMPLARY EMBODIMENTS OF THE PRESENT INVENTION

Figure 1:
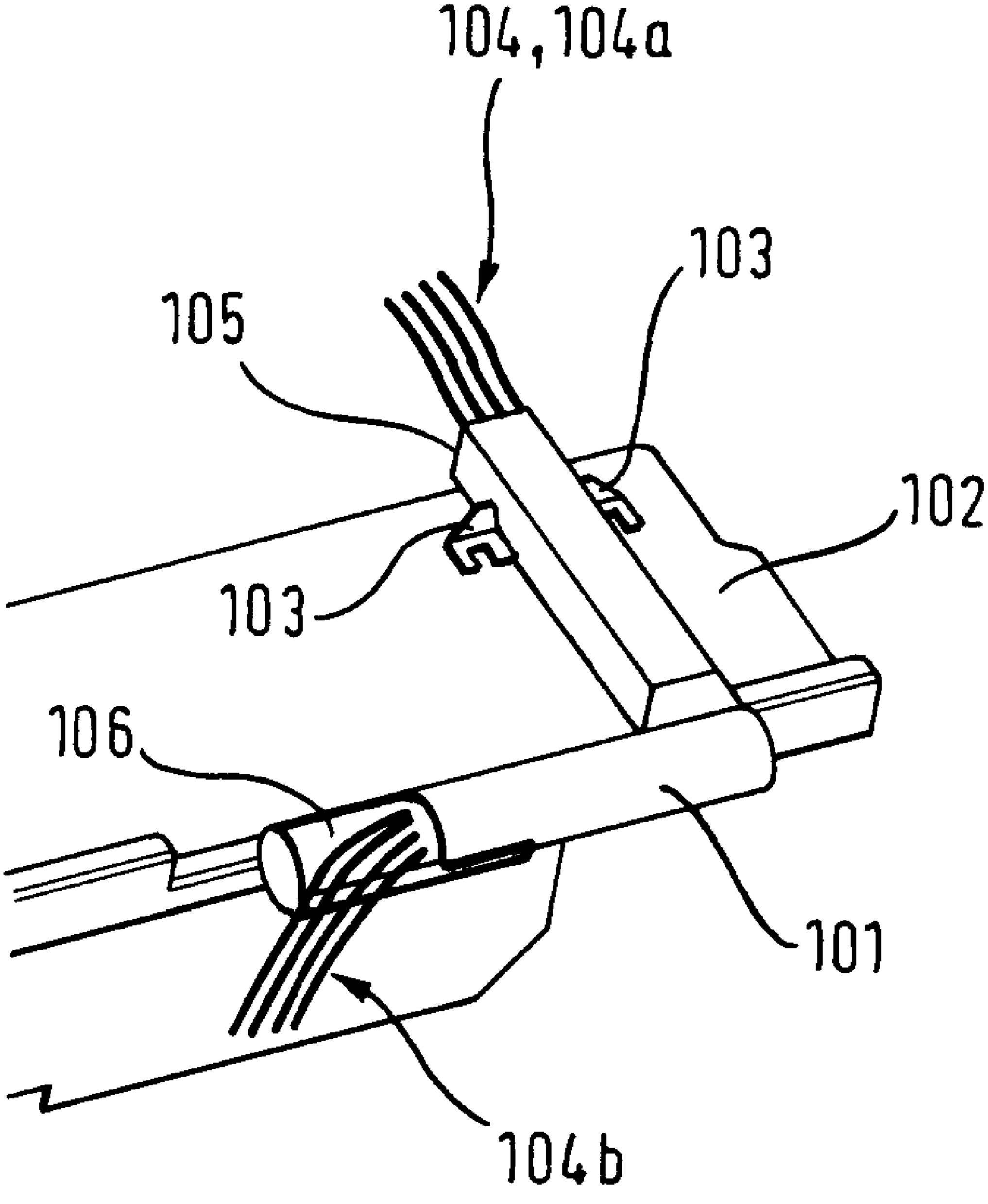
FIG. 1 shows a schematically three-dimensional view of a cable duct of a conventional household appliance fixed on a plinth plate.
Figure 2:
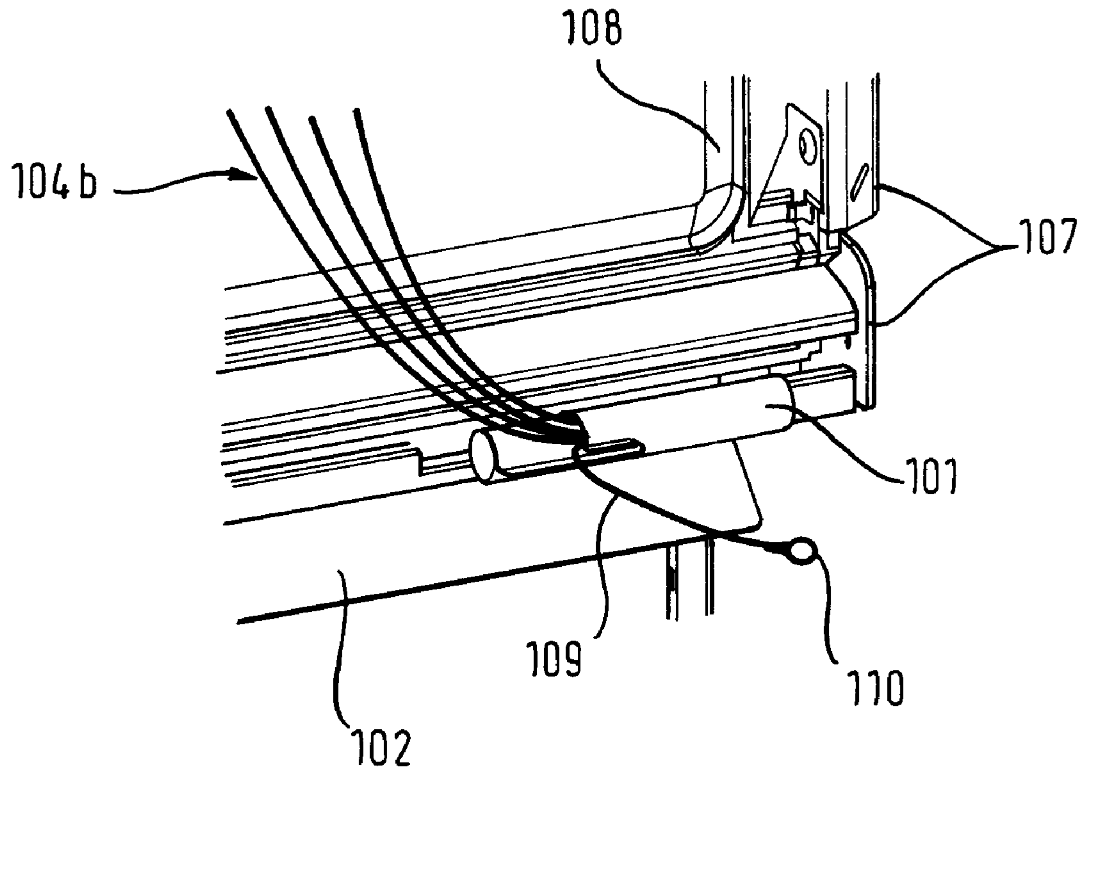
FIG. 2 shows a schematically three-dimensional view of the arrangement of the cable duct from FIG. 1 in the household appliance without a mounted pigtail.
Figure 3:
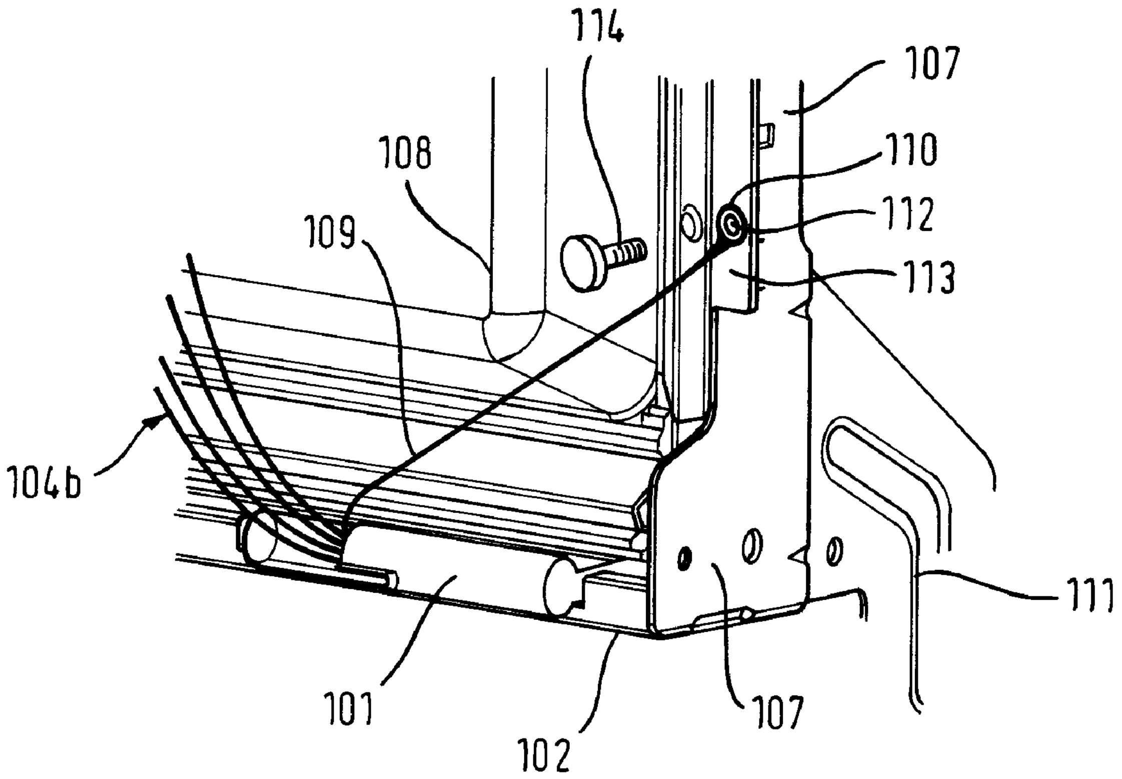
FIG. 3 shows a further schematically three-dimensional view of the arrangement of the cable duct from FIG. 1 in the household appliance with a mounted pigtail.

FIGS. 1 to 3, which show a cable duct of a conventional household appliance fixed on a plinth plate, have already been explained in detail in the introduction to the description, so that any further description here is redundant.

An exemplary embodiment of the inventive household appliance is described with reference to FIGS. 4 to 7.

As already specified in conjunction with the conventional household appliance described in FIGS. 1 to 3, and also realized by the applicant in the industrial series production of, for example, household dishwashers, according to the exemplary embodiment the household appliance of the present invention comprises a near-cuboid treatment compartment, which is anchored on a base bearer serving as a plinth for setting-up of the household appliance. To anchor the treatment compartment four support columns are arranged on the base bearer, which project downwards into the corner areas of the treatment container and are fixed in the base bearer. The two support pillars in the frontal area of the household appliance serve as hinge plates also for the swivel-mounting of a front door which can be swung down and forwards for opening and closing of the treatment compartment. The base bearer accommodates a number of appliance components, such as a central electrical control device, which is connected with various electrical components of the household appliance in each case via electrical cables and serves both power supply purposes and control of the appliance functions. Connection of the control device to the household electricity supply takes place via the rear of the household appliance.

Figure 4:
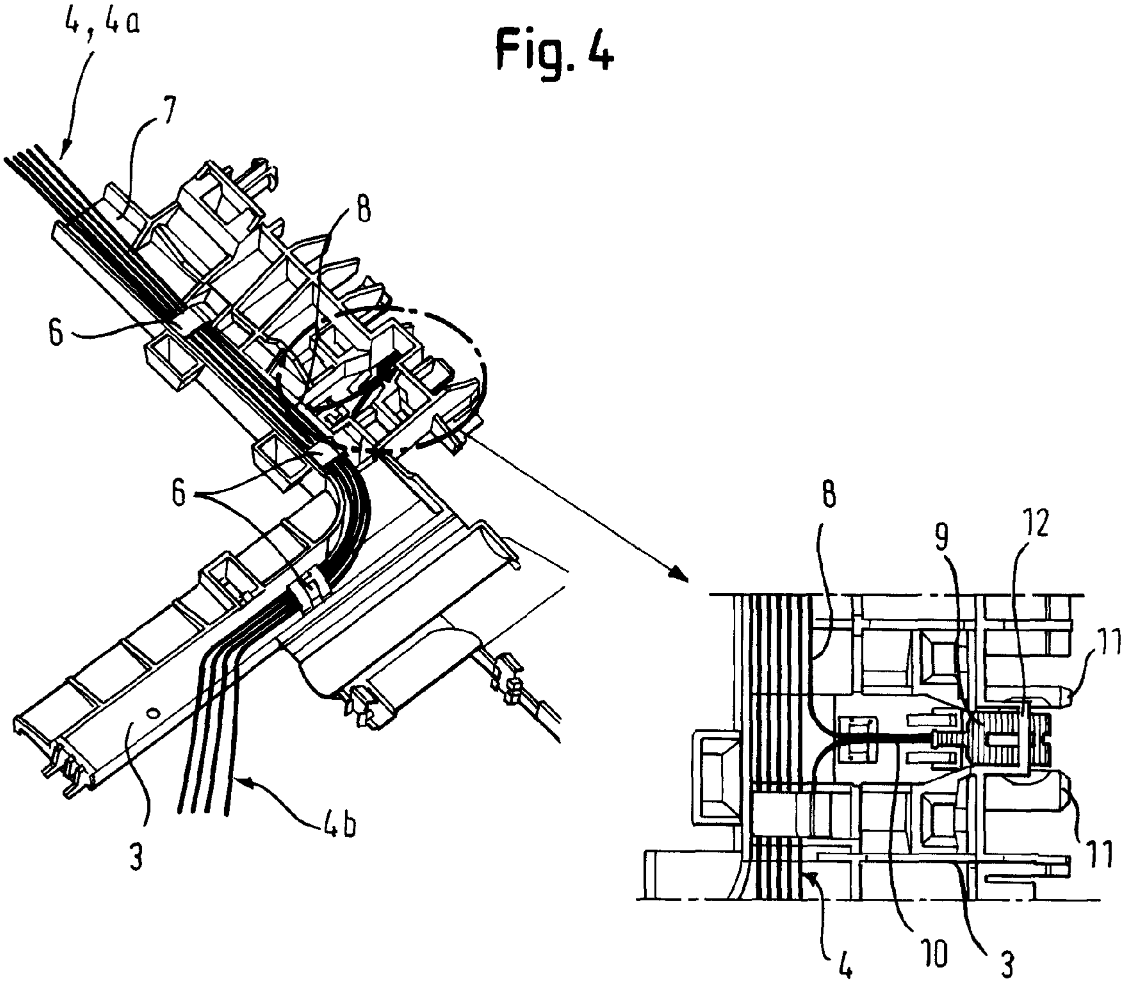
FIG. 4 shows a schematically three-dimensional view of an open cable duct according to an exemplary embodiment of the inventive household appliance.
Figure 5:
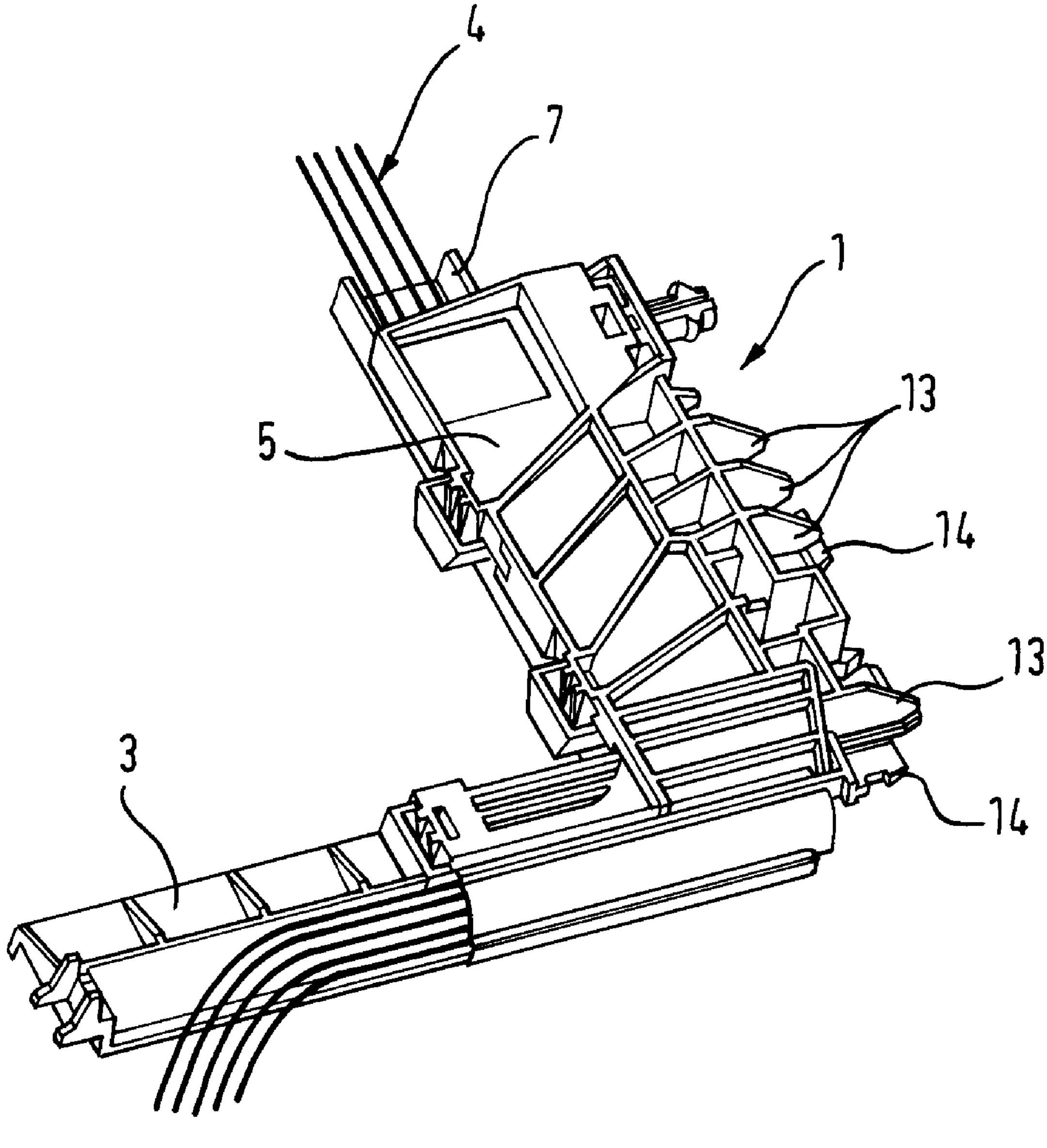
FIG. 5 shows a schematically three-dimensional view of the closed cable duct from FIG. 4.
Figure 6:
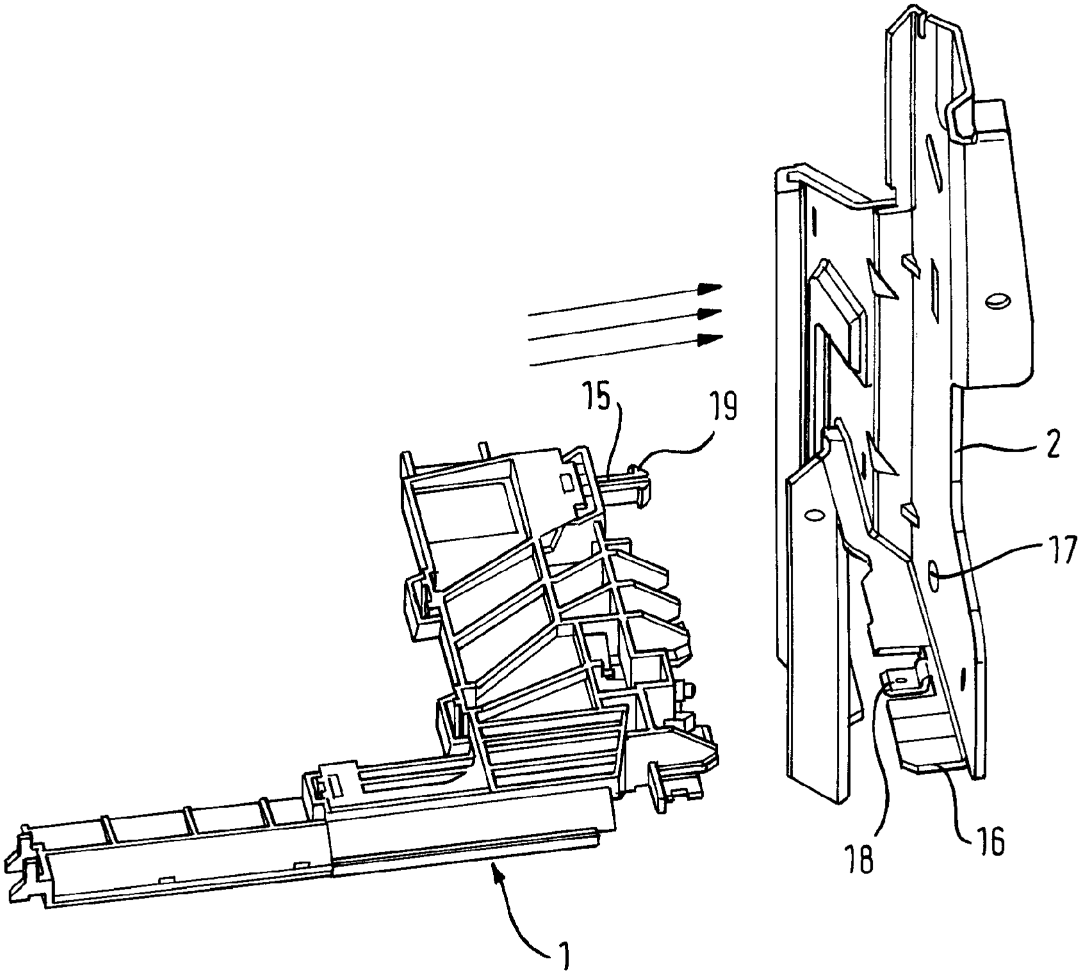
FIG. 6 shows a schematically three-dimensional view of the assembly of the cable duct from FIG. 4 on a hinge plate.

As shown in FIGS. 4 to 6, a cable harness 4 in the frontal area leads from the central control device for power supply purposes and for control of the electrical components of the household appliance, which contains a multiplicity of electrical cables. A cable duct 1 of essentially rectangular form, which is arranged in the frontal area of the household appliance serves the partial accommodation and routing of the cable harness 4, where a rear cable harness section **4*a* leading from the central control device is turned through about 90° in the cable duct 1 and leads to the electrical components in the frontal area of the household appliance as a frontal cable harness section 4*b***.

The cable duct 1 is formed from a duct housing, which is made up of a housing support 3 and a removable housing cover 5. If the housing cover 5 is removed, the cable harness 4 can be fixed on the housing support 3 of the duct housing by means of elastic fixing tabs 6 within a cable guide 7.

The cable harness 4 leading from the cable duct 1 contains a ground cable 8, which is or can be connected to the ground connection of the household electricity supply. As is evident in particular from the enlarged section of FIG. 4, the ground cable 8 is electroconductively connected to a metallic contact reed 9 via a branch 10. The contact reed 9 is fixed between two support ribs 11 and connector bridge 12 connecting the two support ribs 11 in a clamping fit on the housing support 3 of the duct housing. The two support ribs 11 and the connector bridge 12 are formed from the housing support 3 of the duct housing. The contact reed 9, which is connected in this way to the ground connection of the household electricity supply, is arranged in such a way that it projects from the cable duct 1 and can be contacted from outside.

The cable duct 1 is fixed onto the metallic hinge plate 2. To this end the cable duct 1 is provided with a multiplicity of clamping pieces 13 and oppositely located clamping lips 14 arranged in a row, which are clamped onto a clamping link 16 of the hinge plate formed by means of the angle of bend. In addition an engagement pin 15 provided with a splayed pin head 19 projects from the housing support 3, which is arranged in such a way that upon clamping of the cable duct 1 onto the hinge plate 2 it interlocks with an insertion tab 17 of the hinge plate 2.

In FIG. 6 the assembly direction for mounting of the cable duct 1 on the hinge plate 2 is indicated by the arrows shown adjacent to each other. By means of the clamping piece 13, clamping links 14 and the engagement pin 1 a precise positioning of the cable duct 1 for fixing on the hinge plate 2 is predefined.

Figure 7:
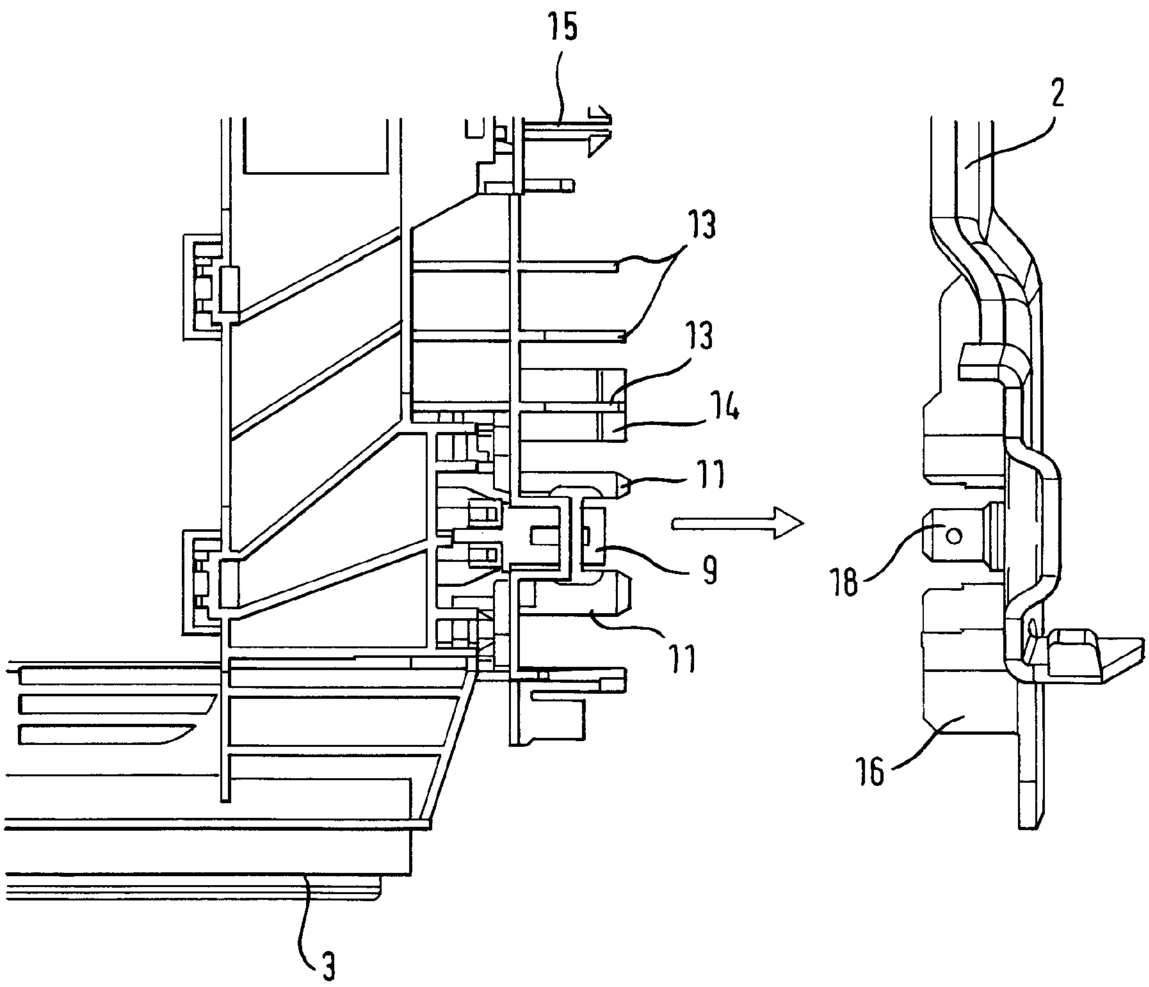
FIG. 7 shows a schematically three-dimensional view of the electrical connection between the cable duct of FIG. 4 and the hinge plate.

The hinge plate 2 is provided with a metallic contact link 18 in the area of the clamping link 16 formed by means of folding and stamping, which in the case of a mounted cable duct 1 comes into contact with the contact reed 9. FIG. 7 shows the arrangement of contact reed 9 and contact link 18 which enables contact to be established upon assembly of the cable duct.

Via the electrical contact between contact reed 9 and contact link 18, the metallic hinge plate 2 and a treatment compartment fixed thereupon which is electroconductively connected to the hinge plate is connected to the ground connection of the household electricity supply.

In the inventive household appliance assembly of the cable duct is accompanied by a simultaneous electrical connection of the treatment compartment with the ground connection. A separate assembly step for connection of the treatment compartment to the ground connection is thus advantageously not required. Compared with the conventional methods for grounding of the treatment compartment, it is possible to dispense with the fixing screw and the length of the ground cables to be made available for assembly purposes.

LIST OF REFERENCE CHARACTERS

1 Cable duct
2 Support column
3 Housing support
4 Cable harness
4*a* Rear cable harness section
4*b* Frontal cable harness section
5 Housing cover
6 Fixing tab
7 Cable guide
8 Ground cable
9 Contact element
10 Branch
11 Support rib
12 Connector bridge
13 Clamping piece
14 Clamping lip
15 Engagement pin
16 Clamping link
17 Insertion tab
18 Contact link
19 Pin head
101 Cable duct
102 Plinth plate
103 Angle bracket
104 Cable harness
104*a* Rear cable harness section
104*b* Front cable harness section
105 Rear opening
106 Frontal opening
107 Hinge bearer
108 Treatment compartment
109 Ground cable
110 Eyelet
111 Carrier leg
112 Threaded hole
113 Fixing tab
114 Fixing screw

The invention claimed is:

1. An appliance, comprising:

a cable harness including a ground cable, the ground cable electroconductively connected to an electrically conductive component of the appliance; a cable duct, wherein the cable harness is at least partially accommodated in the cable duct; and a first contact element integrated with the cable duct and electroconductively connected to the ground cable of the cable harness, which comes into electrical contact with a second contact element of the electrically conductive component of the appliance upon assembly of the cable duct.

2. The appliance as claimed in claim 1, wherein assembly of the cable duct comprises fixing the cable duct to the electrically conductive component.

3. The appliance as claimed in claim 1, wherein the electrically conductive component is connected electroconductively with an at least partially electroconductive clear area of the appliance.

4. The appliance as claimed in claim 1, wherein the electrically conductive component is structured as a support column, to which a treatment compartment having an electrically conductive clear area is fixed.

5. The appliance as claimed in claim 1, wherein the first contact element is structured as a contact reed fixed on the cable duct.

6. The appliance as claimed in claim 1, wherein the second contact element is structured as a contact link formed on a support column.

7. The appliance as claimed in claim 1, wherein the cable duct is fixed on the electroconductive component by a latching plug-in connection.

8. The appliance as claimed in claim 1, further comprising a front door structured with a swivel-mount to be swung down and forwards for opening and closing of a treatment compartment of the appliance, wherein the cable duct is fixed on a support column serving the swivel-mount of the front door.

* * * * *